United States Patent [19]

Beale et al.

[11] 4,378,249

[45] Mar. 29, 1983

[54] GEL FORMING COMPOSITIONS

[75] Inventors: James Beale; Robert F. Viles, both of Staffordshire, England

[73] Assignee: Fosroc International Limited, London, England

[21] Appl. No.: 314,024

[22] Filed: Oct. 22, 1981

[30] Foreign Application Priority Data

Oct. 25, 1980 [GB] United Kingdom ............... 8034445

[51] Int. Cl.$^3$ ............................................. C04B 31/00
[52] U.S. Cl. ............................... 106/74; 106/76; 106/77; 106/84
[58] Field of Search ................... 106/74, 76, 84, 77

[56] References Cited

U.S. PATENT DOCUMENTS

| | | | |
|---|---|---|---|
| 1,896,611 | 2/1933 | Cross | 106/76 |
| 3,839,079 | 10/1974 | Barnett | 106/74 |
| 4,056,937 | 11/1977 | Suzuki | 106/74 X |

FOREIGN PATENT DOCUMENTS

| | | | |
|---|---|---|---|
| 53-73219 | 6/1978 | Japan | 106/74 |
| 606119 | 4/1946 | United Kingdom | 106/74 |

*Primary Examiner*—Helen M. McCarthy
*Attorney, Agent, or Firm*—Cushman, Darby & Cushman

[57] ABSTRACT

A substantially dry powder composition which when mixed with water forms a gel comprises a swelling clay, a sodium silicate having a silica to soda weight ratio of about 2.65:1 or below and an inorganic gelling agent for the sodium silicate which gelling agent does not introduce ions which significantly lower the gelling capacity of the clay.

The composition is particularly suitable for use in coal mines as an anti-combustion material.

8 Claims, No Drawings

GEL FORMING COMPOSITIONS

This invention relates to substantially dry powder compositions based on sodium silicate and clay which when mixed with water produce gels which can be used in sealing, filling and coating applications, particularly in coal mines as an anti-combustion material.

Various gel forming compositions based on sodium silicate, clay and water are already known for use in such operations as soil stabilisation and the cementing of well casings. British Pat. No. 1,131,839 describes the use of a mixture of a clay such as a kaolinite, an illite or a montmorillonite, a sodium silicate having a silica to soda ratio of from 3:1 to 4:1 and an amide gelling agent for the silicate. British Pat. No. 1,016,698 describes the use of a mixture of a clay such as a bentonite, a 3.3:1 silica to soda ratio sodium silicate and an alkaline peptising agent for the clay such as tetra-sodium pyrophosphate.

The known compositions of this type suffer from a number of disadvantages. They require the use of high silica to soda ratio sodium silicates and such sodium silicates are less readily soluble in water than are low ratio silicates thus making the compositions of limited usefulness in applications where it is desirable to use a dry premix of the components which is added to water just prior to use. In addition the clay component does not disperse readily unless a dispersing agent is included in the composition and commonly used dispersing agents for clay such as phosphates have the undesirable side effect of reducing the ultimate viscosity of the clay gel which is produced. Furthermore, compositions which contain volatile and odoriferous organic gelling agents such as amides are unacceptable in a coal mining environment.

It has now been found that these disadvantages may be overcome by the use of a relatively low ratio sodium silicate in conjunction with a swelling clay and an inorganic gelling agent for the sodium silicate.

According to the invention there is provided a substantially dry powder composition which when mixed with water forms a gel comprising a swelling clay, a sodium silicate having a silica to soda weight ratio of about 2.65:1 or below and an inorganic gelling agent for the sodium silicate.

By the term swelling clay is meant a clay which is capable of absorbing large quantities of water and swelling in size to produce a gel, for example, montmorillonite or attapulgite. Bentonite clays which are clays containing a high proportion of montmorillonite are particularly suitable. Various types of bentonite are available and their capacity to swell in water depends on whether the montmorillonite which they contain is a calcium montmorillonite or a sodium montmorillonite. Sodium montmorillonite has a higher swelling or gelling capacity than calcium montmorillonite. Some commercially available clays contain montmorillonite in which the calcium ions have been exchanged for sodium and/or magnesium ions by treating the clay with materials such as sodium carbonate and/or magnesium oxide and/or organic polymers in order to increase the swelling capacity of the clays. In practice such clays have a swelling capacity falling between that of natural calcium bentonite and natural sodium bentonite. While any of these swelling clays may be used in the composition of the invention the preferred clay is a natural sodium bentonite or a treated natural calcium bentonite such as a calcium bentonite treated with sodium carbonate.

Intermediate or low silica to soda weight ratio powder sodium silicates are used in the composition of the invention because such silicates dissolve readily in water and are also effective as dispersing agents for the clay when the composition is mixed with water. Ease of solubility increases as the silica to soda ratio decreases and ability to disperse the clay also increases as the silica to soda ratio decreases, because dispersive power is provided by the sodium ions contained in the silicate and the lower the silica to soda ratio the more sodium ions the silicate contains, weight for weight. The preferred sodium silicate is one having a silica to soda ratio of 2.0:1.

Any solid inorganic gelling agent for the sodium silicate may be used provided that the gelling agent does not introduce into the gelling composition ions which significantly lower the gelling capacity of the clay. Examples of compounds which would gel the silicate but which would be detrimental to the clay are water soluble zinc salts, aluminium salts, chlorides, sulphates and phosphates. The preferred gelling agents are silicofluorides such as sodium silicofluoride, potassium silicofluoride or magnesium silicofluoride, calcium silicates such as dicalcium silicate or calcium silicate-containing materials such as ordinary portland cement and calcium sulphate.

Although the composition is essentially a mixture of dry powders the clay and sodium silicate components will contain some moisture. Commercially available swelling clays commonly contain up to about 15% by weight. Powder sodium silicates are produced by drying, for example by spray-drying, sodium silicate solutions, and they usually contain approximately 10–20% by weight residual water and at this level the commercially available sodium silicates are satisfactory. However at higher moisture levels there is a tendency for reaction to begin between the gelling agent and the sodium silicate while the composition is still in the dry state.

Where the percentage of clay or sodium silicate is quoted below the figure quoted includes any water contained either physically or chemically in the clay or sodium silicate.

If desired a small proportion of an additional dispersion agent for the clay may be included in the composition provided the dispersion agent and quantity used does not significantly affect the gelling properties of the composition. An example of a suitable dispersion agent is sodium carbonate.

Usually the composition of the invention will contain by weight:
50–95% swelling clay:
2–50% sodium silicate:
0.1–20% gelling agent.

The preferred compositions contain:
65–85% swelling clay:
5–30% sodium silicate:
2–15% gelling agent.

The quantity of the composition which is mixed with water to produce a gel will vary depending on the particular application but usually approximately 10–20% by weight of the composition will be used, and the composition itself will be adjusted so that the silicate dissolves readily in water, the clay is thoroughly dispersed and the gelling agent for the silicates acts slowly without deleteriously affecting the gelling of the clay. For the composition to be satisfactory the final gelled product must remain as a gel, i.e. it must be deformable and resilient, and not be converted to a solid mass.

The composition of the invention is particularly suitable for use as a sealant and/or anti-combustion material in coal mines because it can be mixed with water and pumped long distances to desired points of use and then used to produce an air-impervious barrier on a loose coal-containing mass which barrier is sufficiently flexible to accommodate some overall movement of the mass. The gelling rate can be varied to accommodate different pumping distances by varying the actual composition in terms of the components and the amounts of them which are present.

The following examples will serve to illustrate the invention:

EXAMPLE 1

A substantially dry powder composition was prepared by mixing together the components in the following proportions by weight:
82.2% sodium carbonate treated natural calcium bentonite
16.2% sodium silicate ($SiO_2:Na_2O$ 2.0:1, water content 16.0%)
1.6% sodium silicofluoride.

15 parts by weight of the composition were mixed with 100 parts by weight of water and the resulting dispersion had an initial viscosity of about 500 cps.

The dispersion slowly gelled and was pumped into a mass of loose coal in a mine so as to produce an anti-combustion material.

EXAMPLE 2

A number of dry powder gel forming compositions indicated as A to L in the table below are compared.

In each case 12.3% by weight of the composition was mixed with 87.7% by weight of water under low shear conditions for 5 minutes. The viscosity of the aqueous composition was then measured immediately after mixing, 30 minutes after mixing commenced and 24 hours after mixing commenced using a Rotothinner viscometer. The results obtained are also shown in the table below.

Compositions B to F are all compositions according to the invention while composition A is similar to composition C but containing a 3.3:1 $SiO_2:Na_2O$ weight ratio sodium silicate instead of a 2.0:1 ratio silicate. Composition E illustrates the use of an added dispersing agent for the clay, namely sodium carbonate, and composition F illustrates the use of portland cement as gelling agent for the sodium silicate instead of sodium silicofluoride.

Compositions G and H are compositions according to the prior art, and compositions I and J are modifications of G and H in which the phosphate dispersion agent for the clay has been omitted. Compositions K and L illustrate the effect of using a gelling agent for the sodium silicate which has a deleterious effect on the gelling capacity of the clay.

|  | COMPOSITION | | | | | | | | | | | |
| --- | --- | --- | --- | --- | --- | --- | --- | --- | --- | --- | --- | --- |
|  | A | B | C | D | E | F | G | H | I | J | K | L |
| CLAY | | | | | | | | | | | | |
| Proprietary treated natural calcium bentonite | — | — | — | — | — | — | 81.5 | — | 84.6 | — | — | — |
| Sodium carbonate treated natural calcium bentonite | 76.9 | 80.0 | 76.9 | 80.0 | 79.0 | 76.9 | — | 81.5 | — | 84.6 | 76.9 | 80.0 |
| SODIUM SILICATE | | | | | | | | | | | | |
| $SiO_2:Na_2O$ 3.3:1 | 15.4 | — | — | — | — | — | 14.8 | 14.8 | 15.4 | 15.4 | — | — |
| $SiO_2:Na_2O$ 2.65:1 | — | 16.0 | — | — | — | — | — | — | — | — | — | — |
| $SiO_2:Na_2O$ 2.0:1 | — | — | 15.4 | 16.0 | 15.8 | 15.4 | — | — | — | — | 15.4 | 16.0 |
| GELLING AGENT | | | | | | | | | | | | |
| Sodium silicofluoride | 7.7 | 4.0 | 7.7 | 4.0 | 3.95 | — | — | — | — | — | — | — |
| Portland cement | — | — | — | — | — | 7.7 | — | — | — | — | — | — |
| Sodium dihydrogen orthophosphate | — | — | — | — | — | — | — | — | — | — | 7.7 | 4.0 |
| DISPERSING AGENT | | | | | | | | | | | | |
| Tetra-sodium pyrophosphate | — | — | — | — | — | — | 3.7 | 3.7 | — | — | — | — |
| Sodium carbonate | — | — | — | — | 1.25 | — | — | — | — | — | — | — |
| VISCOSITY (Poise) | | | | | | | | | | | | |
| After 5 minutes | — | 0.60 | 0.35 | 0.20 | 0.10 | 0.35 | 0.10 | 0.19 | 0.25 | 1.5 | 0.12 | 0.13 |
| After 30 minutes | — | 0.85 | 3.00 | 0.60 | 0.25 | 0.95 | 0.13 | 0.30 | 0.40 | 2.0 | 0.30 | 0.21 |
| After 24 hours | — | 1.30 | >15 | >15 | 6.0 | 8.0 | 0.26 | 0.70 | 0.85 | 4.5 | 2.0 | 0.90 |

It was found impossible to disperse composition A in water and consequently this composition which contains a 3.3:1 $SiO_2:Na_2O$ ratio silicate is completely unsatisfactory.

Composition B which contains a 2.65:1 $SiO_2:Na_2O$ ratio silicate gave satisfactory results although the viscosity in the initial stages of gel formation was rather high and the final viscosity was rather low.

Composition C which contains a 2.0:1 $SiO_2:Na_2O$ ratio silicate was dispersed readily in water and gave a high ultimate gel strength. The relatively high viscosity after 30 minutes is indicative that the composition is particularly suitable for short range pumping i.e. distances of less than 1000 meters.

Composition D is similar to composition C except that it contains less sodium silicofluoride gelling agent. The results obtained were also similar except that the viscosity after 30 minutes was lower and the composition is therefore more suitable for long range pumping applications i.e. for distances of the order of 3000 meters and above.

Composition E which contains sodium carbonate as a dispersion agent for the clay also gave good results and this composition is also suitable for long range pumping.

Composition F which contains portland cement as gelling agent for the clay was also satisfactory even though the viscosity of the gel produced was lower than with compositions C and D after 24 hours.

Both compositions G and H dispersed readily in water but the viscosity even after 24 hours was far too low due to the effect of the phosphate ions on the gelling capacity of the clay.

Compositions I and J in which the phosphate dispersion agent was omitted both had poor dispersion properties. Composition I also had poor gelling properties due to the nature of the clay resulting in a weak gel while composition J, although giving high viscosity results, was also unsatisfactory because it was not possible to obtain a uniform dispersion.

Both compositions K and L gave unsatisfactory results because the phosphate ions from the silicate gelling agent affected the gelling capacity of the clay.

We claim:

1. A substantially dry powder composition which when mixed with water forms a gel which remains deformable and resilient and is not converted to a solid mass consisting essentially of 50–90% by weight of a swelling clay, 2–50% by weight of a sodium silicate having a silica to soda weight ratio of about 2.65:1 or below and 0.1–20% by weight of an inorganic gelling agent for the sodium silicate selected from the group consisting of silicofluorides, calcium silicates and calcium sulphate.

2. A composition according to claim 1 wherein the clay is montmorillonite or attapulgite.

3. A composition according to claim 1 or claim 2 wherein the clay is a natural sodium bentonite or a treated natural calcium bentonite.

4. A composition according to claim 1 wherein the silica to soda ratio of the sodium silicate is 2.0:1.

5. A composition according to claim 1 wherein the silicofluoride is sodium silicofluoride, potassium silicofluoride or magnesium silicofluoride.

6. A composition according to claim 1 wherein the calcium silicate is dicalcium silicate or portland cement.

7. A composition according to claim 1 containing in addition sodium carbonate.

8. A composition according to claim 1 consisting essentially of by weight:
65–85% swelling clay
5–30% sodium silicate
2–15% gelling agent.

* * * * *